United States Patent [19]
Nakamura et al.

[11] Patent Number: 5,604,835
[45] Date of Patent: Feb. 18, 1997

[54] INTEGRATED OPTICAL WAVEGUIDE DEVICE

[75] Inventors: Tohru Nakamura, Mitaka; Tomonori Tanoue, Machida; Takeshi Kato, Akishima; Mitsuo Takeda, Hachioji, all of Japan

[73] Assignee: Hitachi, Ltd., Tokyo, Japan

[21] Appl. No.: 361,681

[22] Filed: Dec. 22, 1994

[30]   Foreign Application Priority Data

Dec. 27, 1993 [JP] Japan .................................. 5-330503

[51] Int. Cl.$^6$ ........................................................ G02B 6/10
[52] U.S. Cl. ............................ 385/129; 385/14; 385/132
[58] Field of Search .................................... 385/129–132, 385/14

[56]              References Cited

U.S. PATENT DOCUMENTS

| | | | |
|---|---|---|---|
| 3,785,717 | 1/1974 | Croset et al. | 385/132 |
| 4,835,575 | 5/1989 | Plihal | 357/30 |
| 5,061,029 | 10/1991 | Ishikawa | 385/132 |
| 5,163,118 | 11/1992 | Lorenzo et al. | 385/132 |
| 5,194,079 | 3/1993 | Tumminelli et al. | 385/131 |
| 5,438,639 | 8/1995 | Ford et al. | 385/131 |

FOREIGN PATENT DOCUMENTS

| | | |
|---|---|---|
| 57-163207 | 10/1982 | Japan . |
| 57-176006 | 10/1982 | Japan . |
| 59-220703 | 12/1984 | Japan . |
| 1-042132 | 2/1989 | Japan . |
| 3-029903 | 2/1991 | Japan . |
| 3-144514 | 6/1991 | Japan . |
| 4-094536 | 3/1992 | Japan . |
| WO92/06394 | 4/1992 | United Kingdom . |

OTHER PUBLICATIONS

"Trench Bulge Waveguides for Integrated Optical Circuits", B. Muller, et al, Frequenz, vol. 45, No. 9/10, Oct. 1991, Berlin DE, pp. 245–252.

"Waveguide Channel Components for Optical Integrated Circuits Based on Three–Dimensional Optical Waveguides", A. Semenov, et al, Soviet Journal of Quantum Electronics, vol. 18, No. 7, Jul. 1988, New York, US, pp. 835–853.

Primary Examiner—John Ngo
Attorney, Agent, or Firm—Antonelli, Terry, Stout & Kraus, LLP

[57]              ABSTRACT

An integrated optical waveguide device includes a substrate, and an optical waveguide which is formed in the form of projection or is formed in a trench formed in the substrate. Each optical waveguide has a first optical area made of a first optical material and a second optical area which is made of a second optical material and is surrounded by the first optical area. The optical waveguides are arranged on both side faces of the projection or trench.

23 Claims, 14 Drawing Sheets

# INTEGRATED OPTICAL WAVEGUIDE DEVICE

BACKGROUND OF THE INVENTION

The present invention relates to an optical waveguide suitable for information transmission between internal portions of a semiconductor integrated circuit (an IC) and an optoelectronic-integrated circuit (an OE-IC) and between the ICs and the OE-ICs.

A device including semiconductor integrated circuits and optoelectronic-integrated circuits is, in general, constructed in such a way that semiconductor devices and optical devices are integrated on a semiconductor substrate and lines made of a metallic thin film are distributed between those devices. Out of them, the semiconductor devices and the optical devices perform functions such as a signal amplification, light emission and light reception, and the wiring is used to connect/transmit signals output from those devices to the associated devices.

Analyzing the speed components of the signal transmission in the integrated circuit which is manufactured by the present high-advanced technology, the speed of the signal which is propagated through the wiring area connecting the semiconductor devices and the optical devices with each other is remarkably slower than the signal speed (it is also referred to as the switching speed) of the signal which is processed in the semiconductor devices and the optical devices. For example, in the case of a high speed bipolar LSI (large scale integrated circuit) which is manufactured by the 0.8 μm-processing technology, analyzing the signal speed with respect to the typical logical circuit, about 70% of the speed delay is due to the metallic wiring. Therefore, reducing the signal delay associated with the metallic wiring is required for the key technology for manufacturing such a high speed LSI.

On the other hand, an example in which the light is applied to the signal propagation and the high speed wiring is performed at the light velocity corresponds to the so-called OE-IC. FIG. 2 shows structure of an optical waveguide used in the conventional OE-IC and the like. In the figure, an optical waveguide is formed by depositing an area 3 as a wiring portion, through which the light is propagated, on a substrate 1 such as a semiconductor substrate. The area 3 has a thickness and width which are in cross section several μm and several tens μm, respectively, and thus the transverse size (the width) is larger than the thickness. With this structure, if in order to increase the integration, the width of the optical waveguide is made smaller to have the size near the wavelength of the light, the incidence of the optical signal becomes impossible and also the light is diffused to the periphery during the propagation thereof through the optical waveguide so that the optical waveguide can not serve as the optical signal propagating line. In addition, an example of the optical waveguide in which the transverse size is smaller than the thickness is shown in JP-A-62-143004 or JP-A-3-144514 for example. In those examples, the transverse size of the optical waveguide depends on the processing size of a trench. Therefore, if in order to increase the integration, the width of the optical waveguide is made smaller to have the size near the wavelength of the light, the incidence of the optical signal becomes impossible due to the small dispersion in the processing size, and also the light is diffused to the periphery during the propagation thereof through the optical waveguide so that the optical waveguide can not serve as the signal propagating line.

At present, as the high integration has been required year by year in order to attain the high capability of the LSI, both the width of the metallic wiring and a distance between the metallic lines need to be made finer. There is a disadvantage that if the width of the metallic wiring and the distance between the metallic lines are made finer, both the resistance value and the capacitance value per unit length of the metallic wiring increase, the signal transmission speed is increased all the more. Therefore, it is proposed that in the signal propagating line as described above, an optical waveguide is used. In addition thereto, an example relating to the prior art is disclosed in JP-A-3-223801.

SUMMARY OF THE INVENTION

It is therefore an object of the present invention to provide a highly-integrated optical waveguide in which optical waveguides through which signals can be propagated at a high speed can be arranged with higher density than that in the metallic wiring.

It is another object of the present invention to provide a highly-integrated optical waveguide in which optical waveguides though which signals can be propagated at a high speed can be arranged with higher density than that in the metallic wiring with a pair of optical waveguides having the substantially equal propagation delay time as a unit.

Thus, in the optical waveguide of the conventional type structure shown in FIG. 2, even if for the purpose of attaining the high speed operation, the optical signal is used in the integrated circuit, since the width of the optical waveguide is large, it is impossible to increase the integration. In addition, in the example shown in JP-A-62-143004 or JP-A-3-144514, the transverse size of the optical waveguide depends on the processing size of the trench. Therefore, if for the purpose of increasing the integration, the width of the optical waveguide is made smaller to have the size near the wavelength of the light, the incidence of the optical signal becomes impossible due to the small dispersion in the processing size. Also, the light is diffused to the periphery during the propagation thereof through the optical waveguide so that the optical waveguide of interest can not serve as the signal propagating line. In addition, if when making the width of the optical waveguide smaller, the thickness of the optical waveguide (it is defined as the thickness perpendicular to the main surface of the substrate) is not set to the sufficiently large value, the propagation speed of the light in the optical waveguide is decreased thus serving as an obstacle to the promotion of high-speed operation. In the above-mentioned examples, the width and the thickness of the optical waveguide depend on the width and the depth of the trench, respectively. Therefore, in order to form a highly integrated high-speed optical waveguide, i.e., a thick optical waveguide having the small width, and the difficult trench processing is required by which the trench should be formed in such a way that the trench depth is large in relation to the trench width. Therefore, it is difficult to make the promotion of the high integration compatible with the promotion of the high speed operation. Further, there arises a problem that from the similar reason to that as described above, when the propagation of the differential signal, which is often used in the electric circuit, is performed in the optical waveguide, the variation in the group velocity of the optical signal in the optical waveguide is increased due to the dispersion in the waveguide processing size so that the timing between the differential signals is shifted.

For aforementioned and other problems associated with the prior art, the above-mentioned objects of the present invention are attained either by providing one optical waveguide in the form of projection on a substrate or in a trench in the substrate, or by providing optical waveguides in the form of symmetric structure on both the side faces of a projection or a trench.

With respect to the integrated optical waveguide device described above, firstly, a distance between the both side faces of an optical waveguide and sidewalls of a trench can be set arbitrarily. That is, the width of the optical waveguide, i.e., the transverse size thereof can be determined independently of the processing size of the trench. Therefore, even if in order to increase the integration, the width of the optical waveguide is made smaller to have the size near the wavelength of the light, the optical waveguide can be readily formed having the uniform width irrespective of the dispersion in the processing width of the trench. Therefore, the following can be easily prevented: (a) incidence of the optical signal becomes impossible due to the small dispersion in the processing width of the trench and (b) the loss in the signal propagation occurs due to the diffusion of the light into the periphery during the propagation of the optical signal in the optical waveguide. In addition, it is also possible to reduce the dispersion in the wiring delay time attributable to changes in the propagation speed of the light changes depending on the size of the optical waveguide. Secondly, for the same reason as that described above, it is possible to make the trench width larger when forming the high-speed optical waveguide having the high integration, i.e., the thick optical waveguide having a fine width. Thus, the difficult trench processing is made unnecessary in which the trench depth is required to be large in relation to the trench width. As a result, it is easy to make promotion of the high integration compatible with the promotion of the high speed operation. In addition, according to the above-mentioned integrated optical waveguide device, the waveguides are formed on the both side faces of one trench or one projection, whereby two optical waveguides can be formed per trench or projection. Therefore, the promotion of the high density can be readily attained, and also a pair of symmetric optical waveguides can be readily formed. By employing the pair of symmetric optical waveguides, the signals in which the differential timing is synchronized with each other can be propagated therethrough. Synthesizing those aspects, that area is used as the wiring area of the integrated circuit, whereby both the high-speed operation and the high integration which were conventionally impossible can be attained simultaneously, and in particular, the signal transmission speed can be improved to a level of about ten times as large as that of the metallic wiring.

Incidentally, in the preferred embodiments, a silicon nitride film is employed as a core material and a silicon oxide film is employed as a clad material surrounding the core. However, any combination of such materials may also be used, as long as the refractive index of the core material is larger than that of the clad material.

DESCRIPTION OF THE PREFERRED EMBODIMENTS (Embodiment 1)

Figure 1:
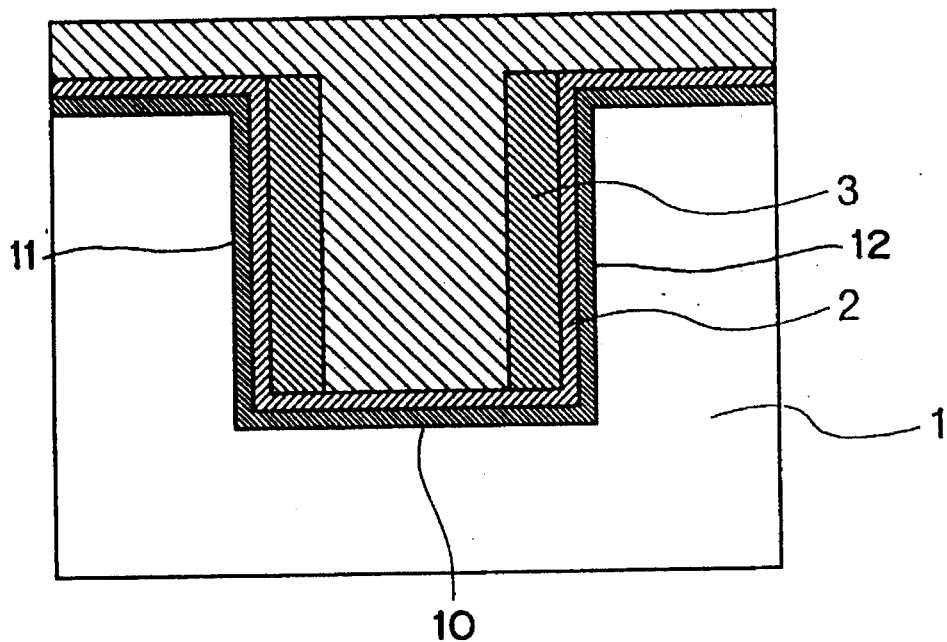
FIG. 1 is a cross sectional view showing structure of an optical waveguide of a first embodiment according to the present invention.
Figure 2:
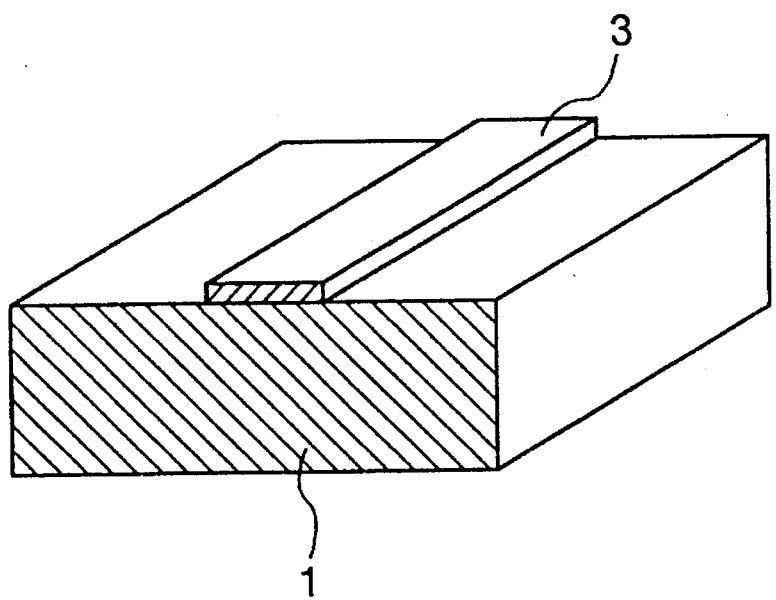
FIG. 2 is a perspective view showing structure of the conventional optical waveguide.

FIG. 1 shows structure of an optical waveguide of a first embodiment according to the present invention. In this embodiment, a substrate 1, made of silicon, for example is employed. A narrow trench 10 is formed in the silicon substrate. In the present embodiment, a width of the trench is set to 5 μm. A silicon oxide film 2 having refractive index of 1.45 is buried as a clad material into the trench and further a silicon nitride film 3 which has larger refractive index of 2.0 than that of the silicon oxide film 2 is buried as a core material thereinto. A thickness of the silicon oxide film is set to 0.6 μm and that of the silicon nitride film is set to 0.3 μm. In addition, a depth of the trench is set to 5 μm. By adopting such structure, sidewalls each of which is constructed by the lamination structure consisting of the silicon oxide film and the silicon nitride film are formed on side faces 11 and 12 of the trench. Each sidewall constitutes an optical waveguide in which the silicon nitride film serves as an optical waveguide layer (a core), and both the silicon oxide film and a space defined in the trench serve as a clad. Thus, a pair of optical waveguides are formed in opposing relation to each other with the silicon nitride film serving as the core. A minimum width of the core of the optical waveguide is determined by the refractive index of the core and the refractive index of the clad surrounding the core. If a wavelength of a laser beam emitted from a laser which is manufactured using compound semiconductor GaAs is 0.83 μm, the minimum width of the core will be about 0.15 μm, and the total minimum width of the optical waveguide including the effusion length of the light into the periphery will be about 0.4 μm. Therefore, with the core width of 0.3 μm as shown in the present embodiment, no attenuation occurs and as a result, the light can be transmitted sufficiently. In addition, since if the wavelength of the light is made shorter, the width of the core can be thinned, in order to improve the high integration, if the light having the shorter wavelength is employed, the thickness of the core can be set to a level equal to or lower than 0.1 μm. In the metallic wiring, setting the width of the wiring material is made 0.1 μm, the resistance is increased and also the capacitance between the adjacent lines. Therefore, it is clear that such fine wiring can not be used in the integrated circuit for which the high speed is required. From the simple calculation and examination results, as compared with the metallic wiring having the width of 0.1 μm, in the wiring employing the optical waveguide having the same size as that of the metallic wiring, the high speed performance is improved by about ten times or more. If the optical waveguide which has been described in the present embodiment is used, in such a way, both the high speed performance and the high integration can be attained simultaneously. In addition, by forming the optical waveguide in such a way, the fixed thickness of the core layer can be obtained irrespective of the width of the trench. Further, since the two optical waveguides can be formed per trench, the optical waveguides can be readily formed with high density.

Figure 3:
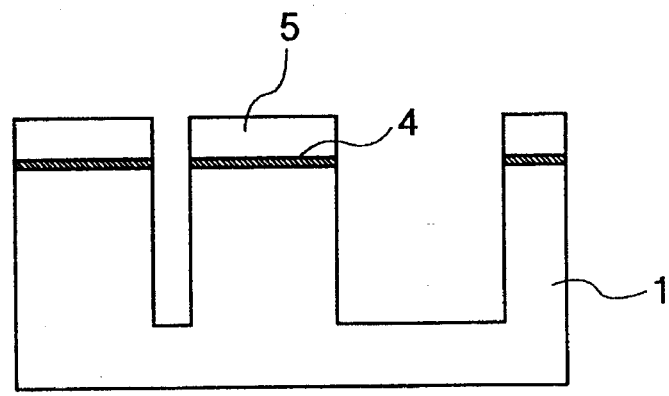
FIG. 3 is a cross sectional view showing a process of manufacturing the optical waveguide of the first embodiment according to the present invention.
Figure 4:
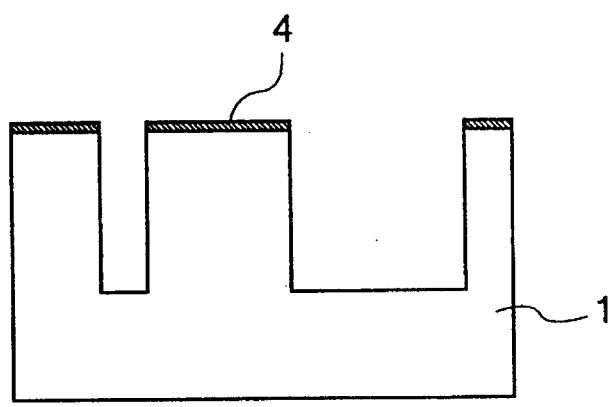
FIG. 4 is a cross sectional view showing a process of manufacturing the optical waveguide of the first embodiment according to the present invention.
Figure 5:
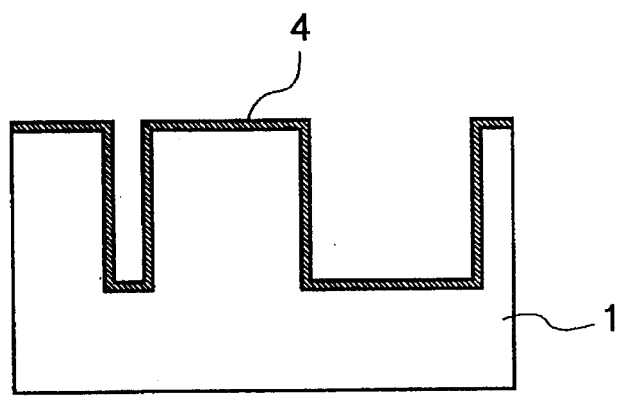
FIG. 5 is a cross sectional view showing a process of manufacturing the optical waveguide of the first embodiment according to the present invention.
Figure 6:
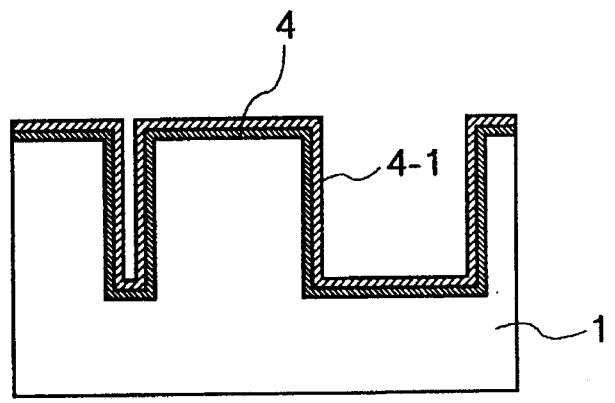
FIG. 6 is a cross sectional view showing a process of manufacturing the optical waveguide of the first embodiment according to the present invention.
Figure 7:
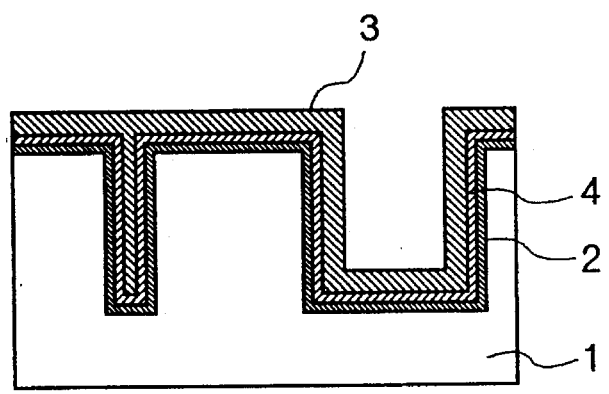
FIG. 7 is a cross sectional view showing a process of manufacturing the optical waveguide of the first embodiment according to the present invention.
Figure 8:
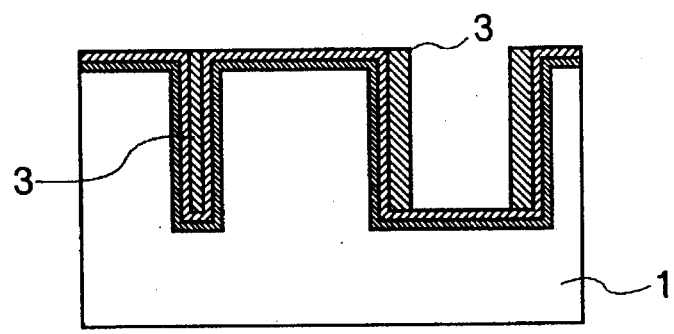
FIG. 8 is a cross sectional view showing a process of manufacturing the optical waveguide of the first embodiment according to the present invention.
Figure 9:
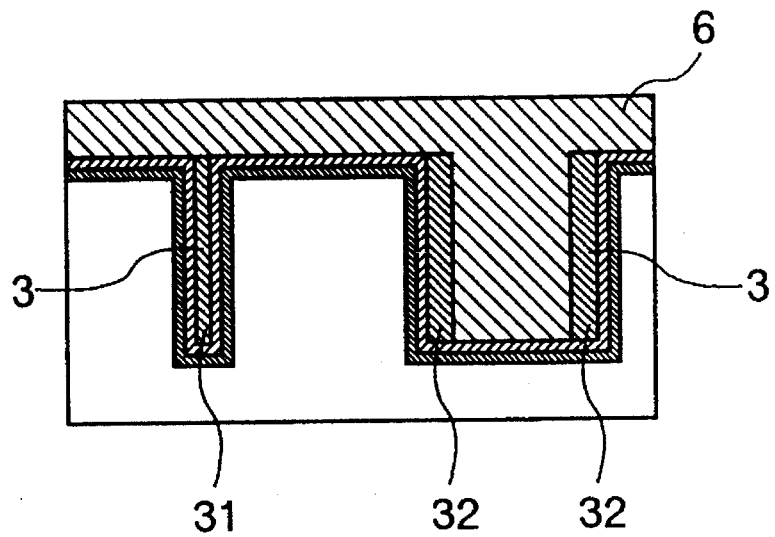
FIG. 9 is a cross sectional view showing a process of manufacturing the optical waveguide of the first embodiment according to the present invention.

FIGS. 3 to 9 show cross sectional views showing steps of a manufacturing process of the optical waveguide of the first embodiment. A surface of the silicon substrate 1 is heated at 1,000° C. in oxygen ambience to form an oxide film 4. A photo resist film 5 is applied to the whole surface of the oxide film 4 and then holes are bored in desired positions using the well known photolithography technology. Then, with the patterned photo resist film as an etching mask, the oxide film 4 and the silicon substrate 1 are processed by the dry etching method to form fine trenches. In FIG. 3, a trench having a relatively large width is illustrated on the right side and a trench having a fine width is illustrated on the left side. Thereafter, the photo resist film is removed, and in order to remove the irregularity of the surface which occurred during the processing by the dry etching, the silicon substrate is etched by 0.1 μm in the mixed liquid of hydrofluoric acid and nitric acid (refer to FIG. 4). Next, the substrate is heated again at 1,000° C. in oxygen ambience to form an oxide film 4 on the whole surface of the silicon substrate. A thickness of the oxide film 4 is 0.1 μm (refer to FIG. 5). Next, as shown in FIG. 6, under a reduced pressure condition, the substrate is heated in the mixed gas of mon-silane (SiH$_4$) gases and oxygen gases to deposit a silicon oxide film 4-1 with 0.4 μm thickness on the whole surface of the substrate. In the present embodiment, in order to prevent the crystal defect from being generated in the substrate, the first oxide film with 0.1 μm thickness is formed, and then the next oxide film with 0.4 μm thickness is deposited such that the two layer-oxide film with the desired thickness is obtained with the formation process divided into two steps. However, alternatively, the oxide film with 0.6 μm thickness may be formed by only the thermal oxidation method. Thereafter, as shown in FIG. 7, a silicon nitride film with 0.3 μm thickness is formed on the whole surface of the substrate by the chemical vapor deposition method. Next, by using the anisotropic ion sputtering method, the silicon nitride film is selectively etched to leave the silicon nitride film only on the side faces of the trench (refer to FIG. 8). Thereafter, by the same deposition method as that described above, a silicon oxide film 6 is deposited on the whole surface of the substrate (refer to FIG. 9). In such a way, the same structure (FIG. 9) as that of FIG. 1 is completed. In FIG. 9, reference numeral 31 designates one optical waveguide formed in the narrower trench, and reference numeral 32 designates a pair of optical waveguides formed on both the side faces of the wider trench.

(Embodiment 2)

Figure 10:
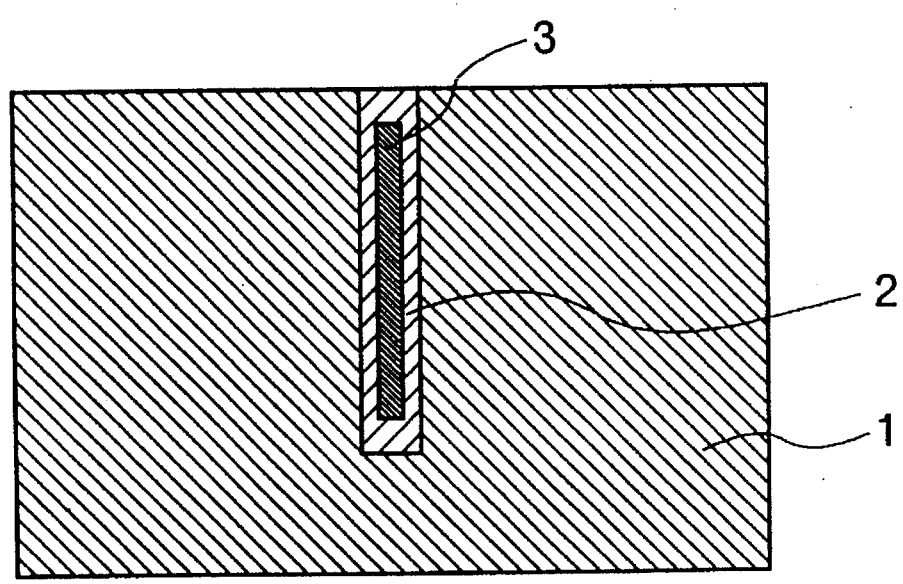
FIG. 10 is a cross sectional view of structure of an optical waveguide useful in explaining a second embodiment according to the present invention.
Figure 11:
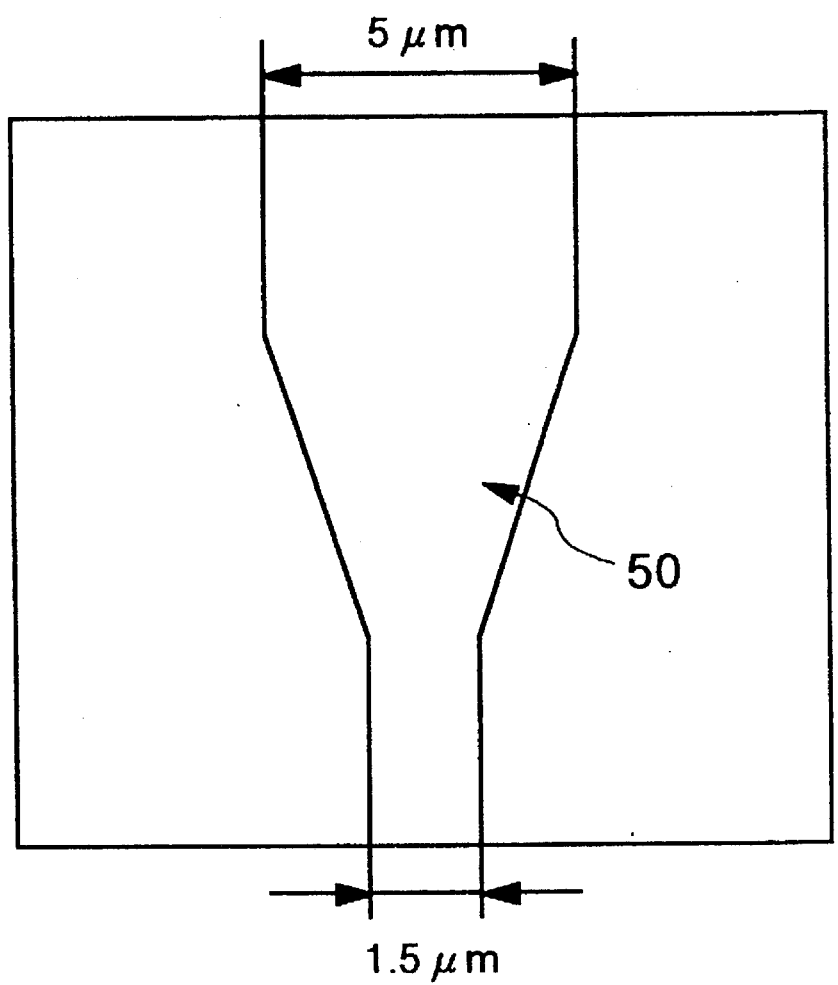
FIG. 11 is a plan view showing structure of the optical waveguide of the second embodiment according to the present invention.

In a second embodiment, as shown in FIG. 11, a width of a part of a trench 50 is gradually reduced so that the width of 1.5 μm is obtained in the narrowest position of the trench 50. As a result, a distance between the optical waveguides which are formed in pairs on both the side faces of the trench 50 is gradually reduced to be one optical waveguide. Thus, the trench 50 is perfectly burried so that as shown in FIG. 10, the optical waveguide is formed in which the silicon nitride film serves as the optical waveguide layer (the core) and the silicon oxide film serves as the clad. This structure operates as a light composing device for two kinds of light beams by making the two kinds of light beams incident to the pair of optical waveguides from the upper side of FIG. 10, and also operates as a branching filter by making the light beams incident to the waveguide from the opposite direction (i.e., from the lower side of FIG. 10). Since the structure is symmetrical, the degree of polarization of the optical output signals of the branching filter is very small, and the ratio of each branching output to the intensity of the incident light beam is in the range of 50%+3%.

(Embodiment 3)

Figure 12:
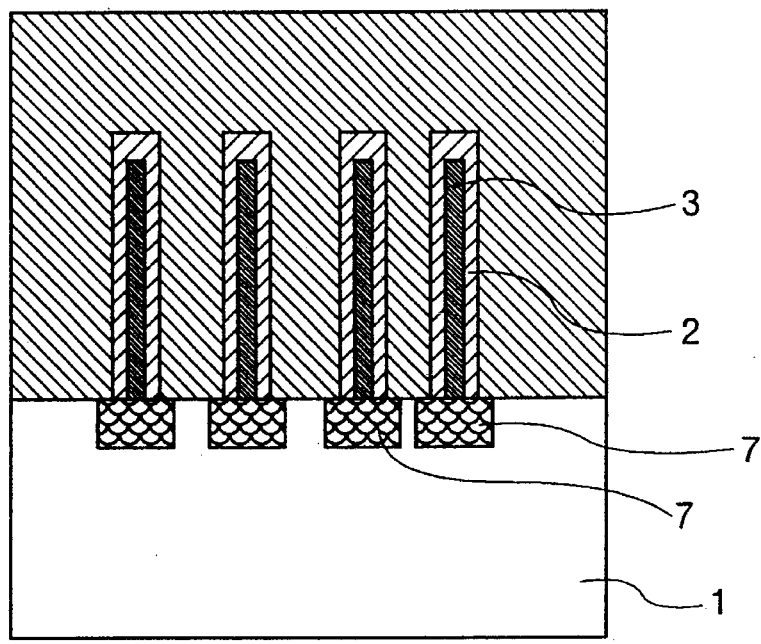
FIG. 12 is a cross sectional view showing structure of an optical waveguide of a third embodiment according to the present invention.

FIG. 12 shows structure of an optical waveguide of a third embodiment according to the present invention. In the present embodiment, an optical waveguide of the present invention is formed on a substrate 1, and on the upper face of a light emitting/photosensitive device 7, the associated optical waveguide is directly connected. By adopting such structure, since after the integrated circuit substrate 1 has been formed, the optical waveguide can be manufactured, it is possible to improve the integration density.

Figure 13:
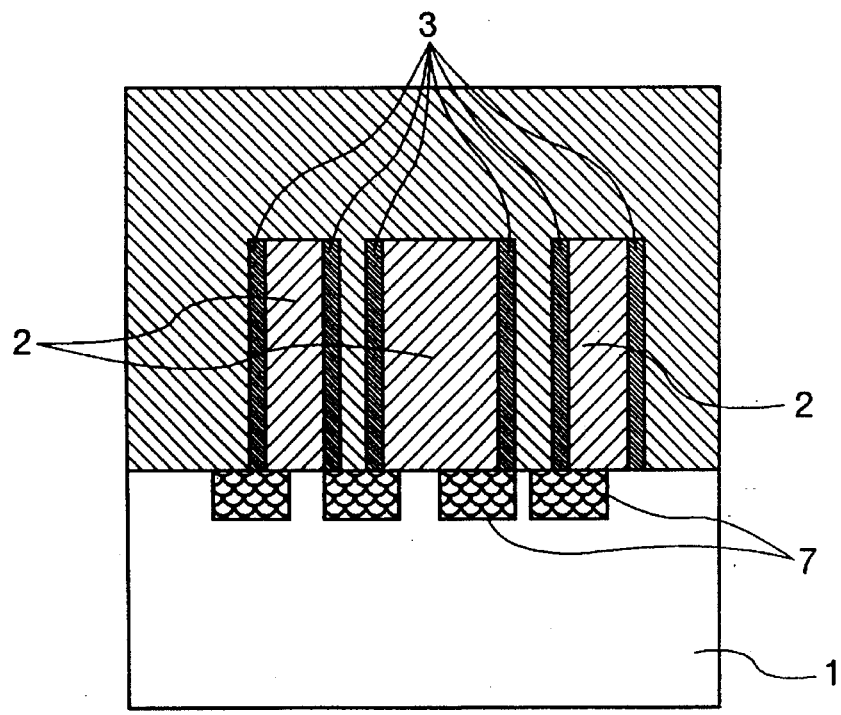
FIG. 13 is a cross sectional view showing structure of an applied example of the third embodiment according to the present invention.

FIG. 13 shows structure of an example in which at least two optical waveguides are formed so as to correspond to the light emitting/photosensitive device 7. By adopting such structure, since one optical waveguide can be connected to the light emitting portion and the other can be connected to the photosensitive portion, the signal can be transmitted at high efficiency.

Figure 14A:
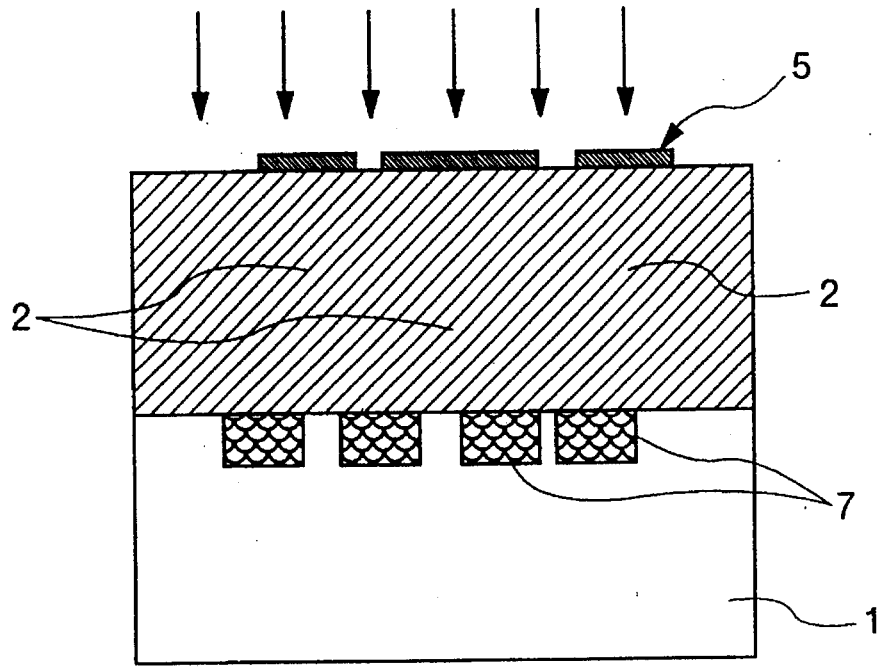
FIGS. 14A to 14D are cross sectional views showing steps of a manufacturing process of the optical waveguide of the third embodiment, shown in FIG. 13, according to the present invention.
Figure 14B:
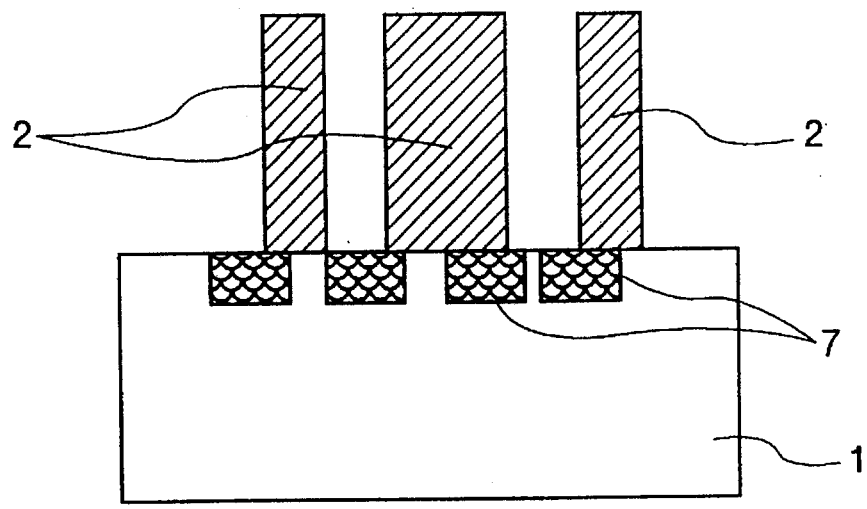
Figure 14C:
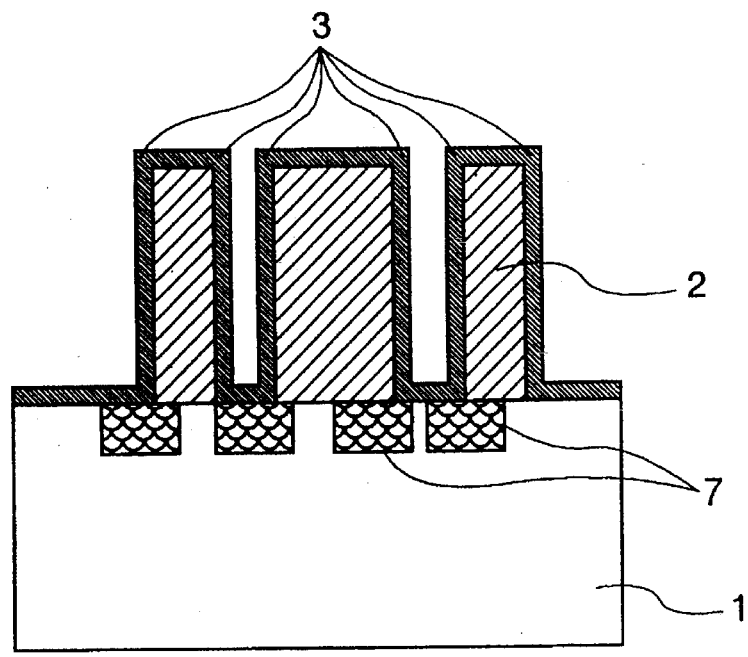
Figure 14D:
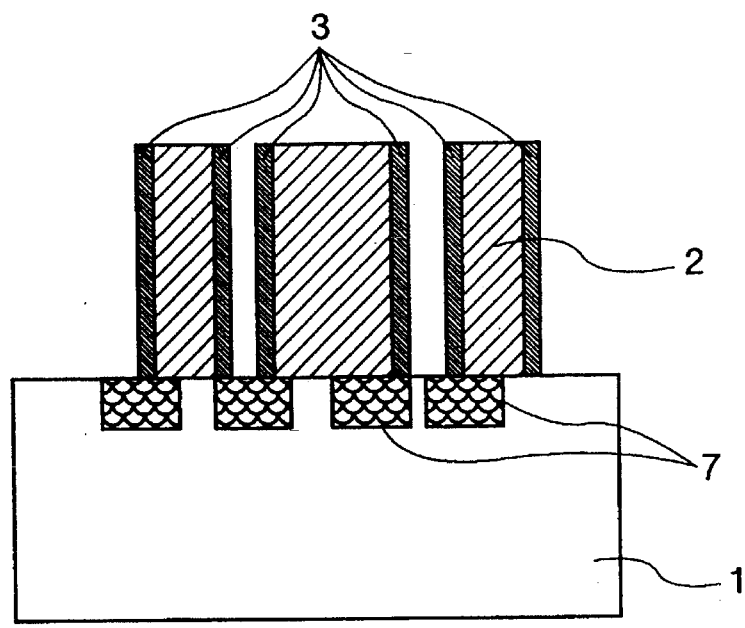

FIGS. 14A and 14B show steps of one method of manufacturing the optical waveguide, shown in FIG. 13, according to the third embodiment of the present invention. On the substrate 1 in which the device such as the light emitting/photosensitive device 7 has already been formed, an oxide film 2 is formed (refer to FIG. 14A), and then by both the well known photolithography method and the dry etching method, as shown in FIG. 14B, the oxide film 2 is left only in the positions just under a photo resist film 5. Next, a silicon nitride film 3 is deposited on the whole surface of the substrate 1 (refer to FIG. 14C) and then the whole surface is selectively etched away by utilizing the anisotropic dry etching method to leave the silicon nitride film 3 only on the side faces of the oxide film (refer to FIG. 14D). Thereafter, an oxide film is deposited on the whole surface of the substrate 1, thereby manufacturing the structure of the third embodiment (refer to FIG. 13).

(Embodiment 4)

Figure 16:
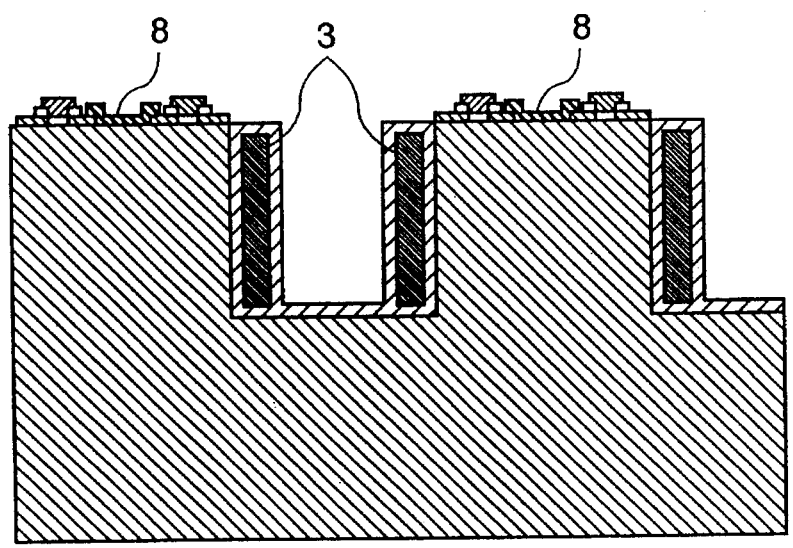
FIG. 16 is a cross sectional view showing structure of an optical waveguide of a fourth embodiment according to the present invention.

FIG. 16 shows structure of an optical waveguide of a fourth embodiment according to the present invention. In the present embodiment, the optical waveguides are formed between integrated circuits 8. By applying such structure to a computer system, both the improvements in the calculation speed and the increasing of the integration density can be attained. In addition, if the communication system is mounted on the integrated circuit(s) 8, the very high speed intelligent communication system can be manufactured.

(Embodiment 5)

Figure 17:
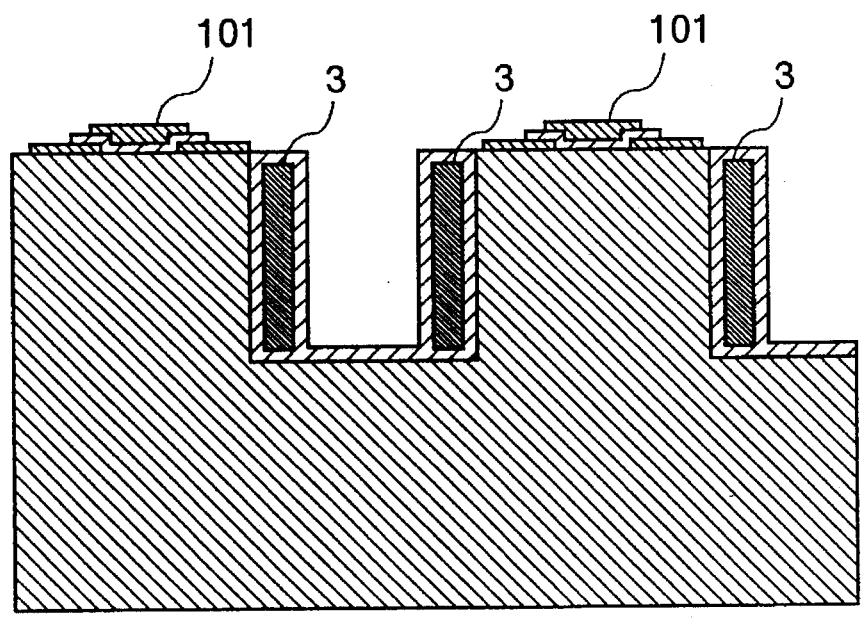
FIG. 17 is a cross sectional view showing structure of an optical waveguide of a fifth embodiment according to the present invention.

FIG. 17 shows structure of an optical waveguide of a fifth embodiment according to the present invention. In the present embodiment, a pair of optical waveguides are formed in an isolation trench formed between transistors 101. Even in such structure, both the transistor characteristics and the optical characteristics do not change at all as compared with the case where the optical waveguides and the transistors 101 are formed independently of each other. As a result, the optical waveguides are provided in the electronic integrated circuit so as to be combined therewith so that the signal can be transmitted in the form of light.

(Embodiment 6)

Figure 18:
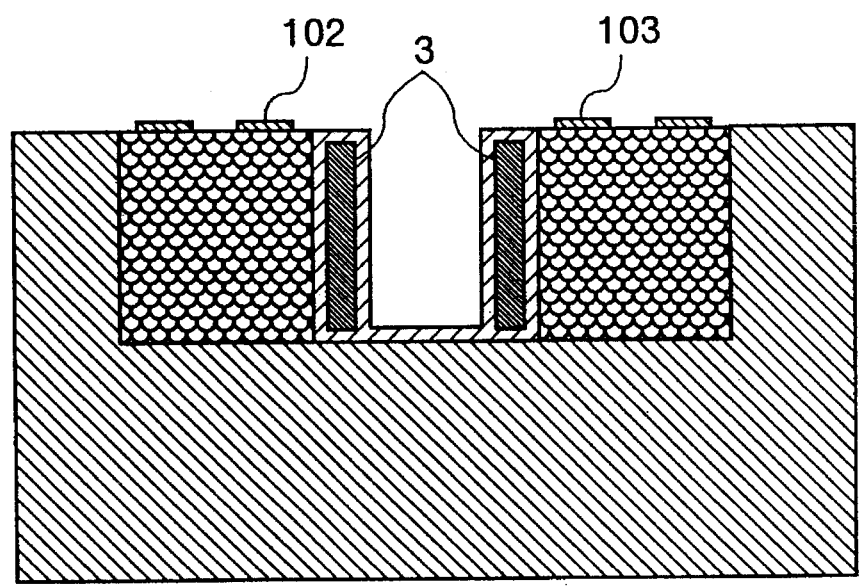
FIG. 18 is a cross sectional view showing structure of an optical waveguide of a sixth embodiment according to the present invention.

FIG. 18 shows structure of an optical waveguide of a sixth embodiment according to the present invention. In the present embodiment, a pair of optical waveguides are formed in an isolation trench provided between a side-light, emission-type, light-emitting device 102 and a side-light, reception-type photosensitive device 103. In such a structure, the coupling efficiency of the light-emitting, device and the optical waveguide, and that of the photosensitive device and the optical waveguide, can be readily increased.

(Embodiment 7)

In the present embodiment, the optical waveguide and the optical branching filter of the second embodiment are formed, in the form of the structure of the fourth embodiment, between the integrated circuits 8 to be used to transmit a clock signal for the individual integrated circuits. If the distribution of the clock signal used to synchronize the individual portions of the integrated circuit with one another is performed in the form of the electric wiring, in order to make the delay due to the wiring resistance and the delay due to the wiring capacitance equal to each other, the design of the wiring becomes necessarily complicated. However, in the optical waveguide of the present invention, since the delay depends on the light velocity, the lengths of the optical waveguides has only to be made equal to each other simply. In addition, in the large scale circuit, since the capacitance of the clock wiring becomes very large, the consumed power of the clock driving circuit becomes enormous. However, if the optical wiring is employed, this consumed power can be remarkably reduced. Such structure is applied to the computer system for example, whereby both the improvements in the calculation speed and an increase in integration density can be attained. In addition, if the communication system is mounted on the integrated circuit(s) 8, the very high speed intelligent communication system can be manufactured.

(Embodiment 8)

Figure 19:
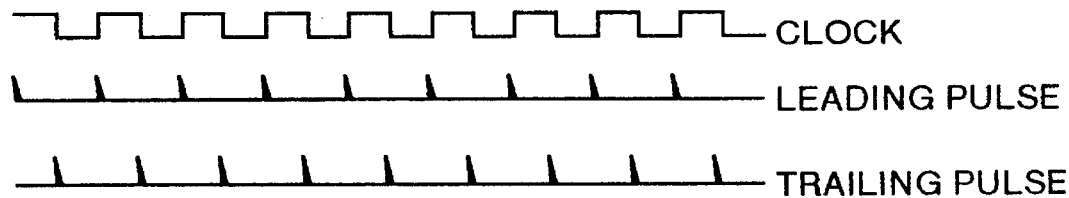
FIG. 19 is a view useful in explaining an eighth embodiment according to the present invention.
Figure 19:
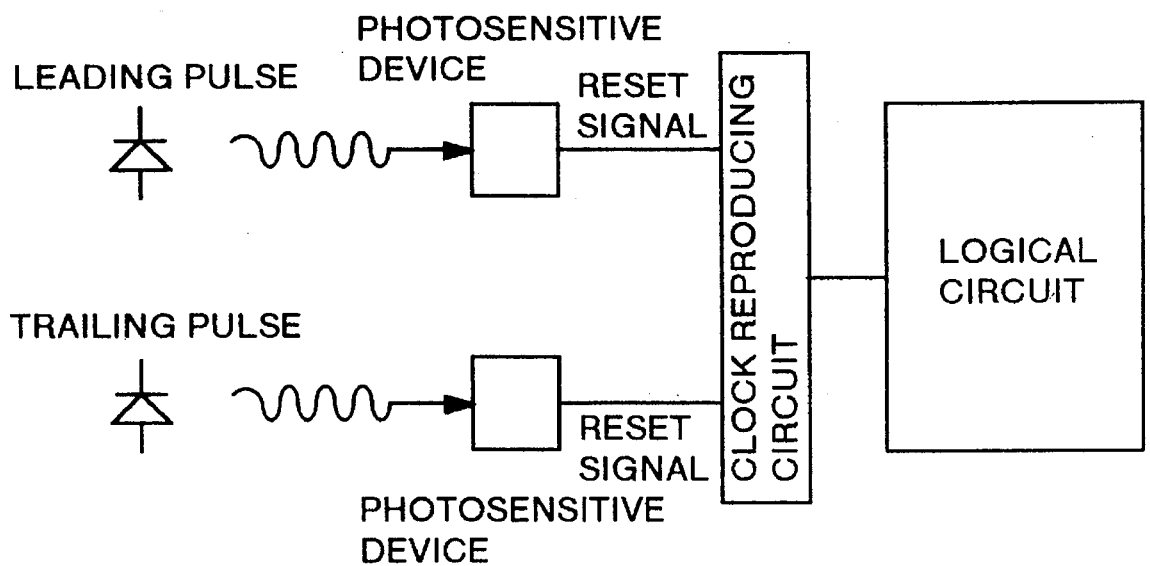

In this embodiment, the optical waveguide of the second embodiment is used to transmit a clock signal of the integrated circuit. In this connection, as shown in FIG. 19, the two optical waveguides are used to transmit the leading pulse for the clock and the trailing pulse for the clock, respectively, and thus the optical signal is generated in the form of pulses at the leading and trailing timing. As a result, the period of time during which the optical signal is generated can be shortened to promote the reduction of the consumed power. In addition, the leading pulse and the trailing pulse are transmitted through the respective two optical waveguides independently of each other, whereby the malfunction due to the counting mistake of the pulse can be completely removed. By employing the optical waveguide of the second embodiment, a pair of signal transmission lines the characteristics of which are equal to each other can be readily formed. Therefore, the jitter between the leading and trailing pulses can be effectively reduced. Further, the clock signal is transmitted in the form of light similar to the eighth embodiment, whereby there are provided advantages that the design of the wiring can be readily performed, the consumed power can be reduced, and so forth. Therefore, such structure is applied to the computer system for example, whereby both the improvements in the calculation speed and the integration density can be attained.

(Embodiment 9)

Figure 20:
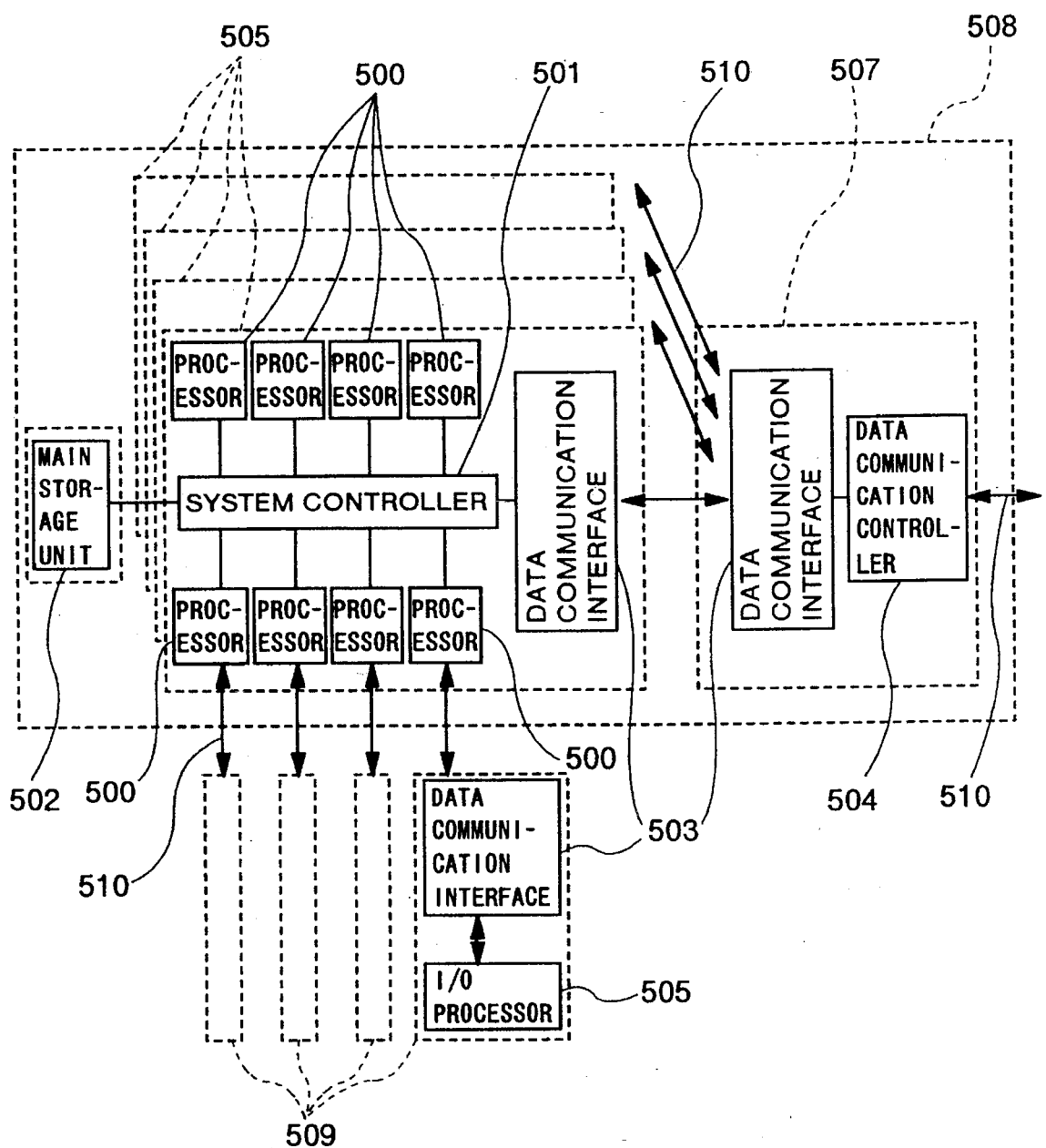
FIG. 20 is a block diagram showing a configuration of a computer system of a ninth embodiment according to the present invention.

Next, a ninth embodiment will now be described with reference to a block diagram showing a configuration of a computer system of FIG. 20. The ninth embodiment is an example wherein the silicon semiconductor integrated circuit embodying the present invention is applied to the high-speed, large scale computer to which a plurality of processors 500 for processing the instructions and the calculation are connected in parallel. In this connection, the optical waveguides of the present invention are used in the connection between the internal portions of the integrated circuit and between the integrated circuits. For I/O portions to/from the optical waveguides, the light emitting/photosensitive device of silicon, and the light emitting/photosensitive device of compound semiconductor are employed. In the present embodiment, since the integration of the high speed silicon semiconductor integrated circuit embodying the present invention is high, the processors 500 for processing the instructions and the calculation, a system controller 501, a main storage unit 502 and the like can be constructed in a silicon semiconductor chip with one side about 10 to 30 mm. The processors 500 for processing the instructions and the calculation, the system controller 501, and one data communication interface 503 constituted by the compound semiconductor integrated circuits are mounted on the same substrate 506. In addition, one data communication interface 503 and the data communication controller 504 are mounted on the same substrate 507. Those substrates 506 and 507, and a substrate on which the main storage unit 502 is mounted are mounted on a substrate with one side about 50 cm or less, thereby forming a central processing unit 508 of the large scale computer. The data communication between the internal portions of the control processing unit 508, the data communication between a plurality of control processing units, or the data communication between the central processing unit 508 and a substrate 509 on which the data communication interface 503 and the I/O processor 505 are mounted is performed through an optical fiber 510 indicated by a double end arrow line in the figure. In this computer system, since the silicon semiconductor integrated circuits each consisting of the processors 500 for processing the instructions and the calculation, the system controller 501, the main storage unit 502 and the like operate in parallel and at a high speed, and also the data communication is performed with the lights as the media, the number of instruction processings per second can be largely increased.

(Embodiment 10)

Figure 21A:
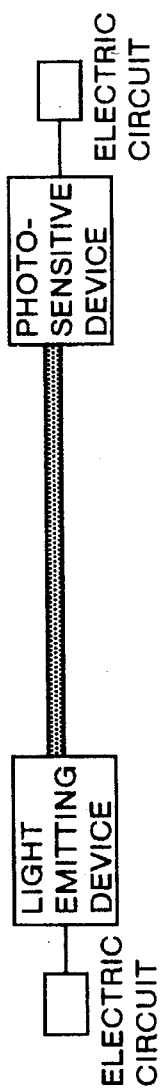
FIGS. 21A to 21C are block diagrams useful in explaining connection between the optical waveguide(s) of the present invention, and a photosensitive device and a light emitting device.
Figure 21B:
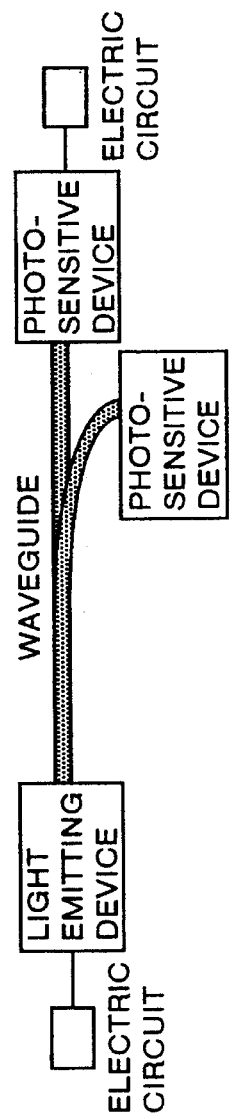
Figure 21C:
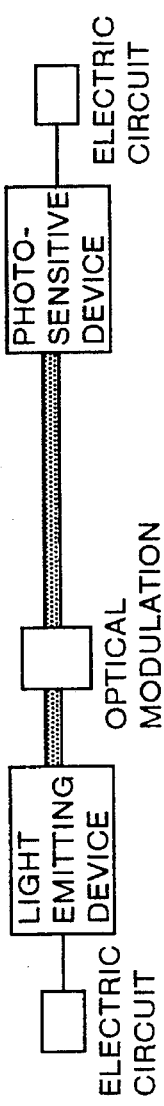

FIGS. 21A to 21C are block diagrams useful in explaining the connection between the optical waveguide of the present invention, and the light emitting device and the photosensitive device. FIG. 21A shows the normal connection. FIG. 21B shows an embodiment which includes at least one optical branch point. FIG. 21C shows an embodiment in which an optical modulator is provided in the middle of the optical waveguide.

Incidentally, in the above-mentioned embodiments of the present specification, the silicon nitride film is employed as the core material, and the silicon oxide film is employed as the clad material surrounding the core. However, any combination of such materials may also be employed as long as the refractive index of the core material is larger than that of the clad material.

For example, for the clad material of $SiO_2$, as the core material, polysilicon, semiconductor, $Ta_2O_5$, polymer, $Si_3N_4$, SiNO, or $SiO_2$ to which the suitable impurities are added may be available.

Figure 15:
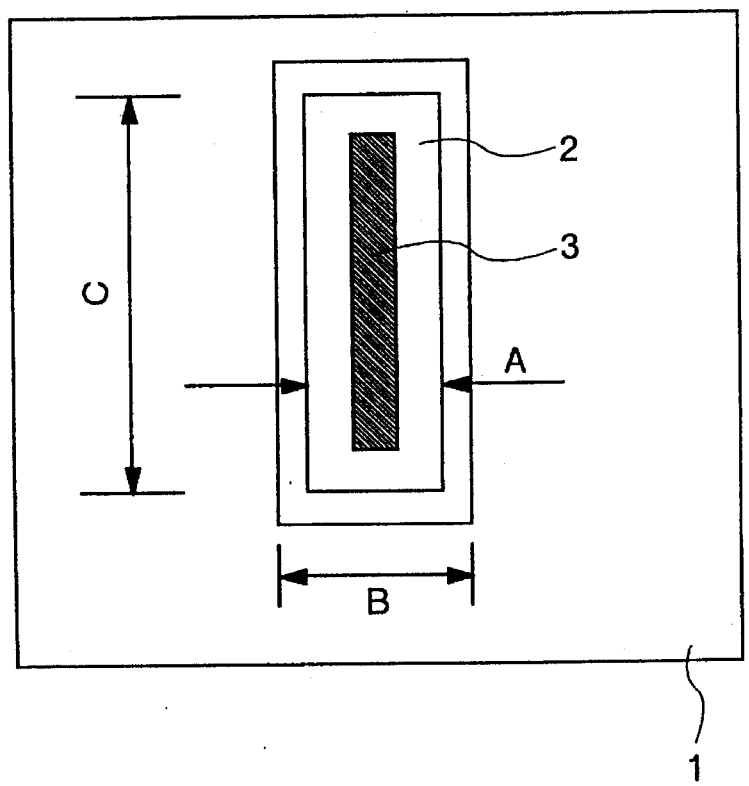
FIG. 15 is a view useful in explaining the minimum size of the optical waveguide of the present invention.

In addition, examples of the minimum size of the optical waveguide, of the present invention, shown in FIG. 15 are shown as follows.

| Clad Material | Core Material | Wavelength | Waveguide Width A | Equivalent Waveguide B | Waveguide Depth C | Propagation Speed |
|---|---|---|---|---|---|---|
| $SiO_2$ | Poly Si | 1.3 μm | 136 nm | 340 nm | 0.75 μm or more | 85 ps/cm |
| $SiO_2$ | $Ta_2O_5$ | 0.78 μm | 213 nm | 532 nm | 0.33 μm or more | 63 ps/cm |
| $SiO_2$ | PIQ | 1.3 μm | 740 nm | 1850 nm | 1.50 μm or more | 53 ps/cm |
| $SiO_2$ | $Si_3N_4$ | 0.78 μm | 190 nm | 475 nm | 0.70 μm or more | 67 ps/cm |

The relationship between the width of the optical waveguide and the core will now be generally described by taking a two-dimensional optical waveguide as an example.

Figure 22A:
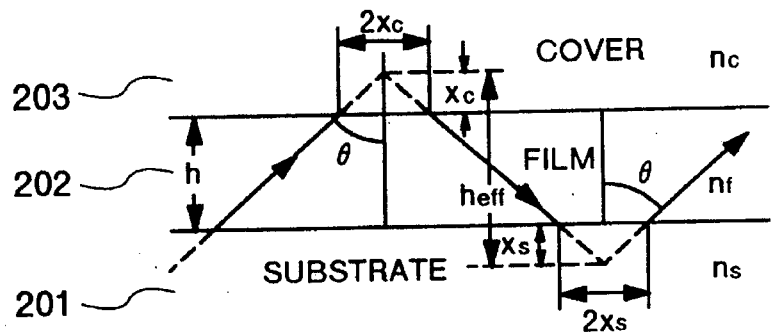
FIG. 22A is a view useful in explaining the propagation of the light in a two-dimensional optical waveguide.

According to an article of T. Tamir et al.: Guided-Wave Optoelectronics (Second Edition) Springer Series in Electronics and Photonics, Springer-Verlag, 1990, in an optical waveguide, of FIG. 22A, including a substrate 201, a film 202 and a cover layer 203, the light is optically guided as indicated by an arrow. Incidentally, in the present invention, since both the substrate and the cover layer are made of the same material, the refractive index of the substrate is the same as that of the cover layer. In addition, the film layer corresponds to the core layer of the optical waveguide of the present invention.

Figure 22B:
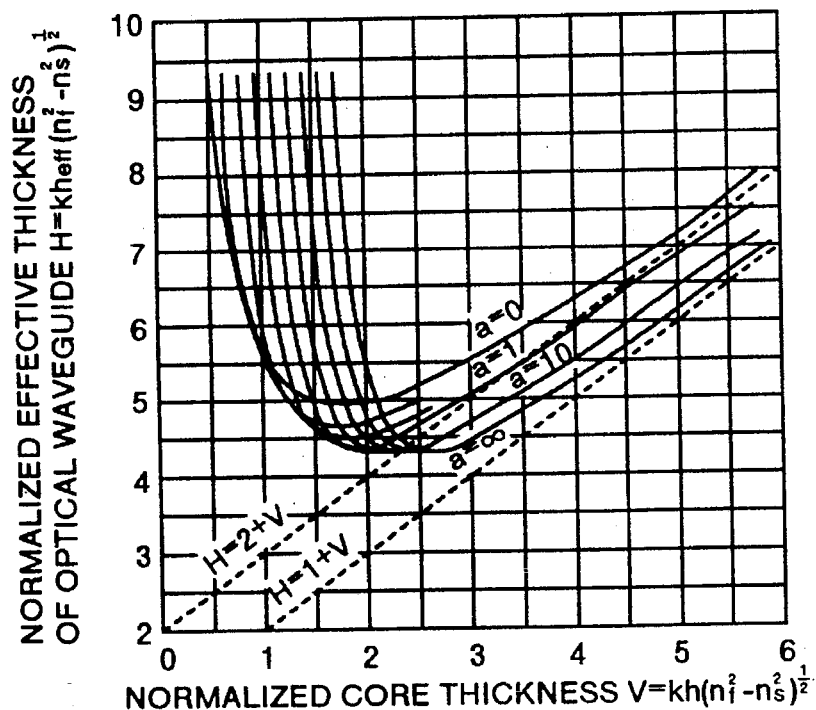
FIG. 22B is a graphical representation useful in explaining the relationship between a normalized effective thickness (H) of the two-dimensional optical waveguide and a normalized core thickness (V) thereof.

At this time, in the relationship between a normalized effective thickness H of the optical waveguide and a normalized core thickness V, as can be seen from FIG. 22B, the minimum values are obtained with a value a as a parameter. But, in this case, since both the substrate and the cover layer are made of the same material, the value of a is zero. As can be seen from FIG. 22B, at the minimum value, H=5 and V=2 are obtained. This minimum value indicates that when the thickness of the core is determined, the minimum value of the effective thickness of the optical waveguide is defined. In other words, that minimum value represents that in the case of the thickness equal to or larger than the effective thickness, the light can not be optically guided through the optical waveguide.

Since the values of H and V are respectively determined, the effective thickness $h_{eff}$ of the optical waveguide and the core thickness h are respectively determined on the basis of the following expressions.

$$h = \frac{V}{k\sqrt{n^2_f - n^2_s}}, k = \frac{2\pi}{\lambda}$$

$$h_{eff} = \frac{H}{k\sqrt{n^2_f - n^2_s}} = \frac{H}{V} h$$

where λ is a wavelength, $n_f$ is refractive index of the core and $n_s$ is refractive index of the substrate (the clad).

Figure 22C:
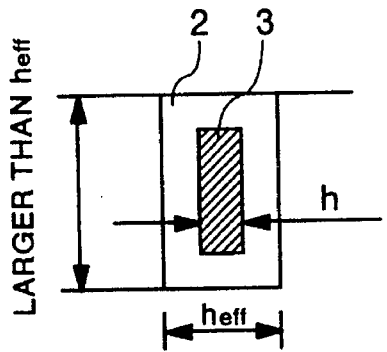
FIG. 22C is a view useful in explaining the size of an example of the optical waveguide of the present invention.

The size of the optical waveguide of the present invention is determined on the basis of a schematic view of FIG. 22C. In the above-mentioned article (T. Tamir et al.), the trench type optical waveguide as the present invention is not shown, but the two-dimensional optical waveguide is generally shown. The present invention relates to the trench type optical waveguide in which the effective thickness $h_{eff}$ of the optical waveguide corresponds to the trench width, and the core thickness h thereof corresponds to the core width. It should be noted that in the present invention, the trench width is not smaller than the effective thickness $h_{eff}$ at all.

What is claimed is:

1. An integrated optical waveguide device comprising:
a substrate; and
an optical waveguide including a first optical area which is made of a first optical material and is formed in the form of projection on a surface of said substrate or is provided in a trench formed in said substrate, and a second optical area which is made of a second optical material, and is provided on a side face of said projection or trench, and is surrounded by said first optical area,
wherein refractive index of said second optical material is larger than that of said first optical material, and a length $h_{\it eff}$, parallel to said substrate, of said first optical area is expressed by the following relation, $$h_{\it eff} = \frac{H}{k\sqrt{n^2_f - n^2_s}} = \frac{H}{V} h$$

and a length h, parallel to said substrate, of said second optical area is expressed by the following relation, $$h = \frac{V}{k\sqrt{n^2_f - n^2_s}}, k = \frac{2\pi}{\lambda}$$

where H represents a normalized thickness of said first optical area, V represents a normalized thickness of said second optical area, $\lambda$ represents a wavelength, $n_s$ represents refractive index of said first optical area, and $n_f$ represents refractive index of said second optical area.

2. A device according to claim 1, wherein the optical waveguides are formed in pairs on both side faces of said projection formed on the surface of said substrate or said trench formed in said substrate.

3. A device according to claim 1, wherein the size, of said second optical area having the larger refractive index, perpendicular to the surface of said substrate is larger than the size thereof parallel to the surface of said substrate.

4. A device according to claim 1, further comprising: the pair of waveguides which are formed in pairs on both side faces of said projection formed on the surface of said substrate, or said trench formed in said substrate; and a single optical waveguide connected to said pair of optical waveguides.

5. A device according to claim 4, wherein a distance between said pair of optical waveguides, which are formed in pairs on both the side faces of said projection formed on the surface of said substrate, or said trench formed in said substrate, changes gradually to be zero to be said single optical waveguide connected thereto.

6. A device according to claim 1, wherein the optical waveguides are connected to semiconductor light emitting/ photosensitive devices and are located over the upper surface of the semiconductor substrate.

7. A device according to claim 1, wherein the optical waveguides are formed in said trench formed in the semiconductor substrate and are connected to semiconductor light emitting/photosensitive devices.

8. A device according to claim 1, wherein said trench in which the optical waveguides are formed is formed in the semiconductor substrate, and said trench is a trench through which semiconductor devices formed on the same substrate are electrically and optically separated.

9. A computer system comprising said integrated optical waveguide device as defined in claim 1.

10. A communication system comprising said integrated optical waveguide device as defined in claim 1.

11. An integrated optical waveguide device comprising:
a substrate; and
an optical waveguide including a first optical area which is made of a first optical material and is formed in the form of projection on a surface of said substrate or is provided in a trench formed in said substrate, and a pair of second optical areas which are made of a second optical material, and is provided on both side faces of said projection or trench and are surrounded by said first optical area, wherein refractive index of said second optical material is larger than that of said first optical material;
wherein said substrate is a semiconductor substrate, said trench is formed in the semiconductor substrate, and said trench is also used as electrically isolated regions for semiconductor devices on the same substrate.

12. An integrated optical waveguide device comprising:
a substrate; and
an optical waveguide including a first optical area which is made of a first optical material and is formed in the form of projection on a surface of said substrate or is provided in a trench formed in said substrate, and a pair of second optical areas which are made of a second optical material, and is provided on both side faces of said projection or trench and are surrounded by said first optical area, wherein a refractive index of said second optical material is larger than a refractive index of said first optical material, and wherein a size of each of said second optical areas having said second optical material of the larger index of refraction in a direction extending perpendicular to the surface of said substrate is larger than a size of each of said second optical areas in a direction extending parallel to the surface of said substrate.

13. A device according to claim 12, wherein the optical waveguides are connected to semiconductor light emitting/ photosensitive devices and are located over the upper surface of the semiconductor substrate.

14. A device according to claim 12, wherein the optical waveguides are formed in said trench formed in the semiconductor substrate and are connected to semiconductor light emitting/photosensitive devices.

15. A computer system comprising said integrated optical waveguide device as defined in claim 12.

16. A communication system comprising said integrated optical waveguide device as defined in claim 12.

17. An integrated optical waveguide device comprising:
a substrate;
an optical waveguide including a first optical area which is made of a first optical material and is formed in the form of projection on a surface of said substrate or is provided in a trench formed in said substrate, and a pair of second optical areas which are made of a second optical material, and is provided on both side walls of said projection or trench and are surrounded by said first optical area, wherein a refractive index of said second optical material is larger than that of said first optical material;
wherein a pair of optical waveguides are formed at the both side walls of said projection formed on the surface of said substrate, or said trench formed in said substrate; and
wherein a single optical waveguide is connected to said pair of optical waveguides.

18. A device according to claim 17, wherein a distance between said pair of optical waveguides, which are formed in pairs on both the side faces of said projection formed on the surface of said substrate, or said trench formed in said substrate, changes gradually to be zero to be said single optical waveguide connected thereto.

19. An integrated optical waveguide device comprising:
a substrate; and
an optical waveguide structure including:
   a first optical area, made of a first optical material, formed at a predetermined location on said substrate, said predetermined location having first and second side faces, and
   a pair of second optical areas, made of a second optical material, provided respectively on said first and second side faces, said second optical areas contacting different portions of said first optical area to form therewith respective first and second optical waveguides, said second optical material having a refractive index larger than a refractive index of said first optical material, and wherein each of said second optical areas has, in a direction extending substantially perpendicular to a surface of said substrate, a size which is larger than a size of said second optical area in a direction extending substantially parallel to the surface of said substrate.

20. The integrated optical waveguide device recited in claim 19, further comprising:
   a third optical waveguide connected to said first and second optical waveguides, said third optical waveguide being formed when a distance between said first and second optical waveguides gradually change to zero.

21. The integrated optical waveguide device recited in claim 19, wherein said predetermined location is one of a trench and a projection formed on said surface of said substrate.

22. The integrated optical waveguide device of claim 21, wherein said trench is a trench through which semiconductor devices formed on said substrate are electrically and optically separated.

23. The integrated optical waveguide device of claim 19, wherein the substrate is a semiconductor substrate.

* * * * *